United States Patent
Graham et al.

(10) Patent No.: US 9,065,973 B2
(45) Date of Patent: Jun. 23, 2015

(54) SYSTEM AND METHOD FOR DISPLAYING A VIDEOCONFERENCE

(71) Applicants: Philip R. Graham, Milpitas, CA (US);
Chris A. Dunn, San Jose, CA (US);
Blane A. Eisenberg, Saratoga, CA (US)

(72) Inventors: Philip R. Graham, Milpitas, CA (US);
Chris A. Dunn, San Jose, CA (US);
Blane A. Eisenberg, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 13/793,563

(22) Filed: Mar. 11, 2013

(65) Prior Publication Data
US 2013/0258041 A1    Oct. 3, 2013

Related U.S. Application Data

(63) Continuation of application No. 13/333,258, filed on Dec. 21, 2011, now Pat. No. 8,395,650, which is a continuation of application No. 11/567,674, filed on Dec. 6, 2006, now Pat. No. 8,085,290.

(51) Int. Cl.
*H04N 7/14* (2006.01)
*H04N 7/15* (2006.01)

(52) U.S. Cl.
CPC ..................................... *H04N 7/15* (2013.01)

(58) Field of Classification Search
None
See application file for complete search history.

(56) References Cited

U.S. PATENT DOCUMENTS

| | | | |
|---|---|---|---|
| 4,400,724 A | 8/1983 | Fields | |
| 5,737,011 A | 4/1998 | Lukacs | |
| 5,767,897 A * | 6/1998 | Howell | 348/14.07 |
| 6,037,970 A * | 3/2000 | Kondo | 348/14.1 |
| 6,049,694 A * | 4/2000 | Kassatly | 725/144 |
| 6,172,703 B1 | 1/2001 | Lee | |
| 6,266,082 B1 * | 7/2001 | Yonezawa et al. | 348/159 |
| 6,288,740 B1 * | 9/2001 | Lai et al. | 348/14.09 |
| 6,400,401 B1 * | 6/2002 | Morino et al. | 348/211.1 |
| 6,473,114 B1 * | 10/2002 | Strubbe | 348/14.07 |
| 6,593,956 B1 | 7/2003 | Potts et al. | |
| 6,624,841 B1 | 9/2003 | Buchner et al. | |
| 6,710,797 B1 | 3/2004 | McNelley et al. | |

(Continued)

FOREIGN PATENT DOCUMENTS

CN    1257631 A1    6/2000    ............... H04N 7/15

OTHER PUBLICATIONS

The Patent Office of the People's Republic of China Official Action in Application No. 200680053667.1, dated Mar. 23, 2011 with translation, 13 pages.

(Continued)

*Primary Examiner* — Maria El-Zoobi
(74) *Attorney, Agent, or Firm* — Baker Botts L.L.P.

(57) ABSTRACT

According to one embodiment of the present invention, a method for displaying a videoconference includes receiving a first video feed. The first video feed includes a first plurality of video signals, each video signal from at least one source and originating from one or more sites. The method also includes assigning for a videoconference each video signal of the first plurality of video signals to a zone of a plurality of zones of a display window. Each zone of the plurality of zones is able to display one video signal at a time. The method further includes, for each zone of the plurality of zones of the display window to which more than one video signal has been assigned, switching the current video signal to be displayed in the zone to another video signal assigned to the zone based on a switching protocol.

38 Claims, 4 Drawing Sheets

(56) References Cited

U.S. PATENT DOCUMENTS

| | | | |
|---|---|---|---|
| 6,774,927 | B1 | 8/2004 | Cohen et al. |
| 6,795,108 | B2 | 9/2004 | Jarboe et al. |
| 6,882,358 | B1 | 4/2005 | Schuster et al. |
| 6,922,718 | B2 | 7/2005 | Chang |
| 6,989,836 | B2 | 1/2006 | Ramsey |
| 7,043,528 | B2 | 5/2006 | Schmitt et al. |
| 7,057,636 | B1 | 6/2006 | Cohen-Solal et al. |
| 7,111,045 | B2 | 9/2006 | Kato et al. |
| 7,477,282 | B2 | 1/2009 | Firestone et al. |
| 7,612,793 | B2 * | 11/2009 | Potekhin et al. ............ 348/14.01 |
| 7,839,984 | B2 | 11/2010 | Katz |
| 8,115,799 | B2 * | 2/2012 | Zhan .......................... 348/14.08 |
| 8,428,234 | B2 * | 4/2013 | Knaz ......................... 379/201.01 |
| 2002/0154210 | A1 | 10/2002 | Ludwig et al. |
| 2002/0199181 | A1 * | 12/2002 | Allen ................................ 725/1 |
| 2003/0149724 | A1 | 8/2003 | Chang |
| 2003/0160861 | A1 | 8/2003 | Barlow et al. |
| 2003/0193559 | A1 | 10/2003 | Fernandez et al. |
| 2004/0091232 | A1 | 5/2004 | Appling, III |
| 2005/0024484 | A1 | 2/2005 | Leonard et al. |
| 2005/0052528 | A1 | 3/2005 | Ohkawa et al. |
| 2005/0248652 | A1 | 11/2005 | Firestone et al. |
| 2005/0264648 | A1 * | 12/2005 | Ivashin et al. .............. 348/14.09 |
| 2006/0066717 | A1 | 3/2006 | Miceli |
| 2006/0152575 | A1 | 7/2006 | Amiel et al. |
| 2006/0158509 | A1 | 7/2006 | Kenoyer et al. |
| 2006/0168302 | A1 | 7/2006 | Boskovic et al. |
| 2006/0256983 | A1 * | 11/2006 | Kenoyer et al. ............... 381/122 |
| 2007/0206091 | A1 | 9/2007 | Dunn et al. |
| 2008/0136896 | A1 | 6/2008 | Graham et al. |
| 2008/0239062 | A1 | 10/2008 | Civanlar et al. |
| 2009/0284580 | A1 * | 11/2009 | Knaz .......................... 348/14.02 |
| 2010/0073454 | A1 * | 3/2010 | Lovhaugen et al. ........ 348/14.03 |
| 2013/0093835 | A1 * | 4/2013 | Paithankar et al. ......... 348/14.07 |
| 2013/0210401 | A1 * | 8/2013 | Knaz ............................. 455/416 |
| 2013/0227437 | A1 * | 8/2013 | Brody et al. .................. 715/757 |

OTHER PUBLICATIONS

Notification of Transmittal of the International Search Report and the Written Opinion of the International Searching Authority, or the Declaration, Intl. Application No. PCT/US06/45895, mailed Sep. 25, 2007, 8 pages.

USPTO Office Action dated Mar. 1, 2010, regarding U.S. Appl. No. 11/366,861, filed Mar. 2, 2006, inventor Dunn, 12 pages.

Dunn et al., U.S. Appl. No. 11/366,861, filed Mar. 2, 2006, Final Office Action from the U.S. Patent and Trademark Office dated Aug. 3, 2010.

Dunn, et al., *System and Method for Displaying Participants in a Videoconference between Locations*, patent application with drawings; U.S. Appl. No. 11/366,861, filed Mar. 2, 2006;(34 pages).

Dunn, et al., *System and Method for Displaying Users in a Visual Conference between Locations*, patent application with drawings;U. S. Appl. No. 11/483,864, filed Jul. 10, 2006; (27 pages). Jul. 10, 2006.

Weinstein, et al., *Emerging Technologies for Teleconferencing and Telepresence*, Wainhouse Research, 54 pages, 2005.

Lambert, *Polycom Video Communications*, © 2004 Polycom, Inc., 4 pages, Jun. 20, 2004.

Stillerman, *A Look Inside H.239*, www.ihets.org, 3 pages.

Davis, *Video Communications Industry Backgrounder*, Wainhouse Research, www.tandberg.net 4 pages.

Communication from State IP Office of the People's Republic of China, First Office Action regarding Application #200680053667, Issue # 2010022400776940, Cisco Technology, Inc.

U.S. Patent and Trademark Office Official Action in U.S. Appl. No. 11/366,861 dated Mar. 2, 2006, 16 pages.

Dunn, et al., U.S. Appl. No. 11/366,861, communication from the U.S. Patent and Trademark Office dated Mar. 30, 2011.

Davis, *Video Communications Industry Backgrounder, Wainhouse Research*, www.tandberg.net. Jan. 2006.

Itu-T, H.239 (Sep. 2005), Series H: Audiovisual and Multimedia Systems, Infrastructure of audiovisual services—Systems aspects, Role Management and additional media channels for H.300-series terminals.

* cited by examiner

SYSTEM AND METHOD FOR DISPLAYING A VIDEOCONFERENCE

TECHNICAL FIELD

This invention relates generally to the field of telecommunications and more specifically to a system and method for displaying a videoconference.

BACKGROUND

There are many methods available for groups of individuals to engage in conferencing. One common method, videoconferencing, involves one or more individuals located in one location engaging in a videoconference with one or more individuals located in at least one other location, remote from the first videoconferencing involves the use of video equipment, such as cameras, microphones, displays and speakers. These videoconferences often create an artificial and unrealistic experience during the videoconference. There may be several factors contributing to the poor experience, such as when there are more remote users than there are remote cameras and/or local displays.

There are numerous different metrics used by traditional videoconference systems to determine how or where a video image is displayed. For example, some videoconference systems will only present one video signal at a time on a monitor. In these videoconference systems the video signal that is presented within the display is usually determined by voice activity (e.g., the last person to talk is the one that is presented). Some systems may support as many displays as there are remote sites participating in the videoconference. As the number of remote sites participating in the videoconference increase so does the number of displays, which causes the size of displays to decrease. Another example is videoconference systems that divide the monitor into a plurality of displays where each display is associated with a particular remote site (these types of videoconference systems are sometimes referred to a Hollywood Squares or Continuous Presence).

Often the metrics involved in Hollywood Squares type systems do not keep the same remote site within the same local display. For example, each display may initially be populated according to a particular pattern (e.g., left to right, top to bottom) based on the order in which each remote site logs into the videoconference. The displays are subsequently updated based on voice activity. More specifically, the remote site not presented in any of the local displays may upon speaking, replace the remote site that has been quiet the longest. Accordingly, during the course of a videoconference, a particular remote site may, at some point during the videoconference, have spent some time in each of the displays.

Typical videoconferences also usually use Webs ages to push data from a remote site to a local display.

SUMMARY OF THE DISCLOSURE

In accordance with particular embodiments, disadvantages and problems associated with previous techniques for displaying a videoconference may be reduced or eliminated.

According to one embodiment of the present invention, a method for displaying a videoconference includes receiving a first video feed. The first video feed includes a first plurality of video signals, each video signal from at least one source and originating from one or more sites. The method also includes assigning for a videoconference each video signal of the first plurality of video signals to a zone of a plurality of zones of a display window. Each zone of the plurality of zones is able to display one video signal at a time. The method further includes, for each zone of the plurality of zones of the display window to which more than one video signal has been assigned, switching the current video signal to be displayed in the zone to another video signal assigned to the zone based on a switching protocol.

In some embodiments the method may also include generating a second video feed comprising a second plurality of video signals. Each of the second plurality of video signals corresponds to a video signal currently switched to be displayed in a zone of the plurality of zones. The method may also include generating a default video signal comprising a default image or a data video signal comprising a video representation of data to be displayed within each zone of the plurality of zones to which a video signal of the first video feed was not assigned.

In accordance with another embodiment, a system for displaying a videoconference includes an interface operable to receive a first video feed. The first video feed includes a first plurality of video signals, each video signal from at least one source and originating from one or more sites. The system also includes a processor coupled to the interface and operable to assign for a videoconference each video signal of the first plurality of video signals to a zone of a plurality of zones of a display window. Each zone of the plurality of zones is able to display one video signal at a time. The processor is further operable to, for each zone of the plurality of zones of the display window to which more than one video signal has been assigned, switch the current video signal to be displayed in the zone to another video signal assigned to the zone based on a switching protocol.

Certain embodiments of the invention may provide one or more technical advantages. A technical advantage of one embodiment includes providing a consistent presentation of remote users on a local display. Accordingly, local users may be able to identify the speaker in a more natural manner. Another technical advantage of particular embodiments includes assigning remote users to particular zones of a display based on the positioning of the various remote users. For example, a remote user sitting on the left side of a remote table is presented within the left zone of the display window. Accordingly, the movement, gaze and eye contact of a remote user is more accurately reproduced for a local user. Yet another advantage of particular embodiments is the ability to switch the users presented within a particular zone of the display. Accordingly, even if a local site has fewer displays to display the video signals, the local site's experience is not compromised. Instead, the quality of the site's experience is maintained.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
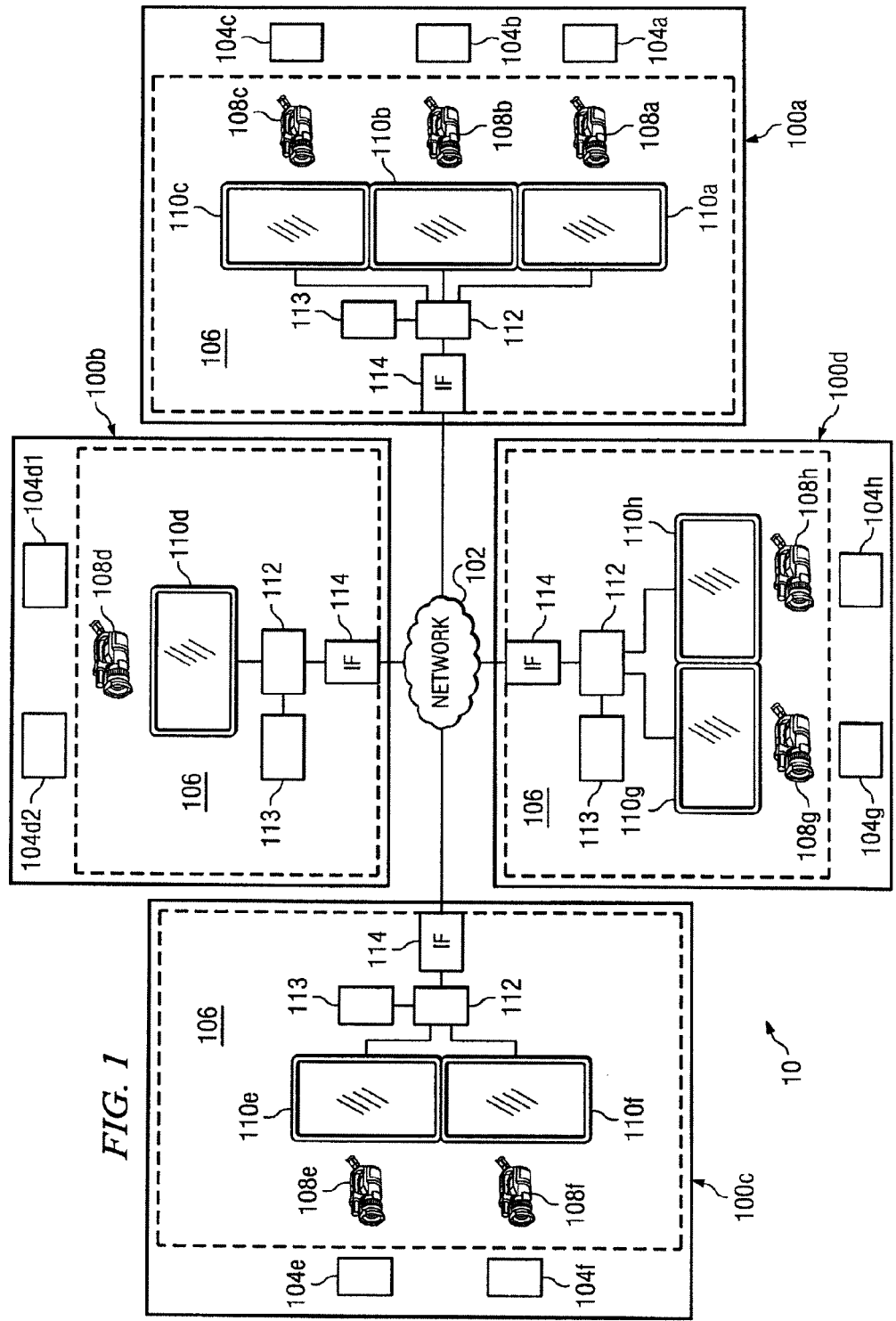
FIG. 1 is a block diagram illustrating a system for conducting a videoconference between sites, in accordance with some embodiments.
Figure 2A:
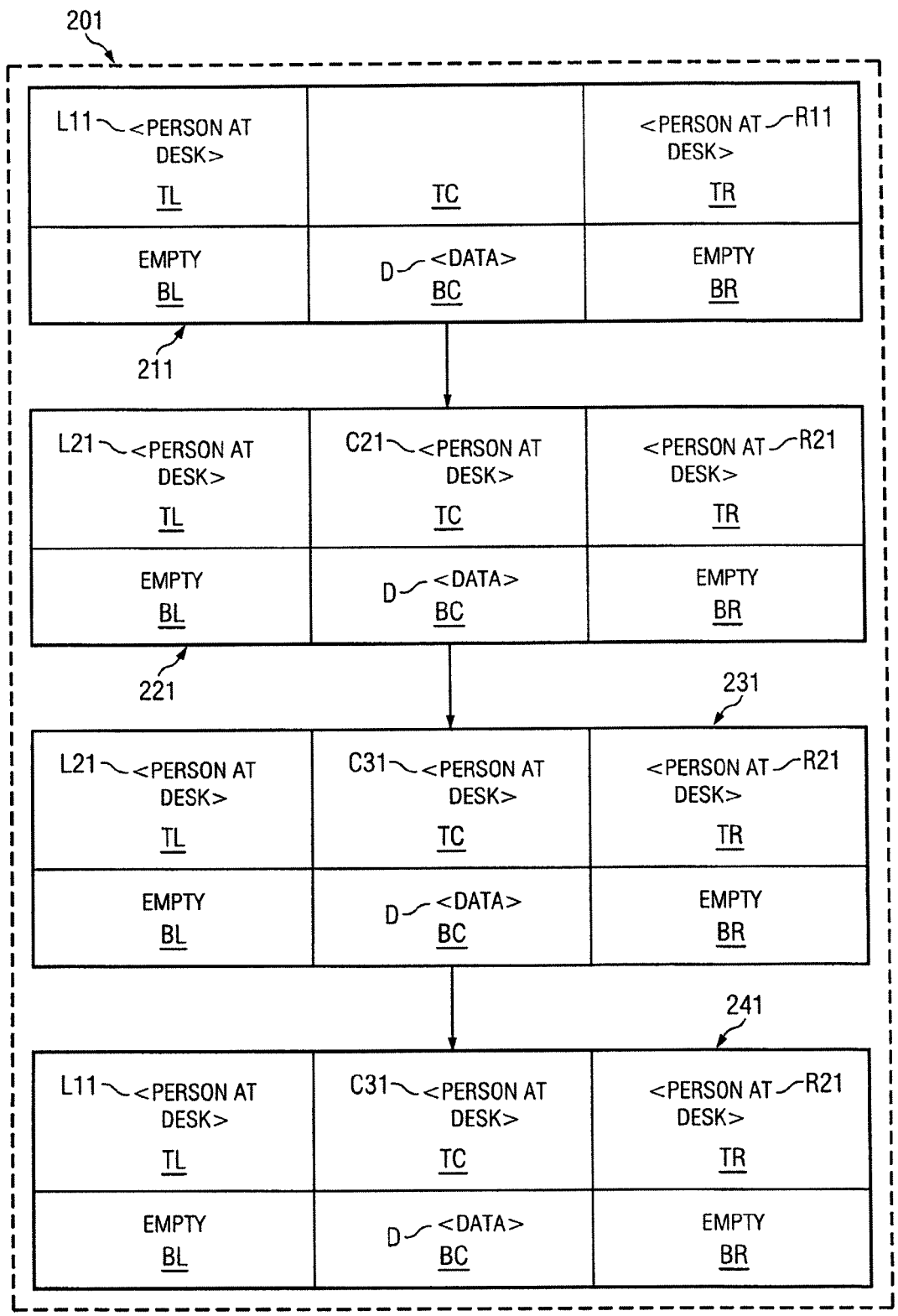
FIGS. 2A-2C illustrate different scenarios showing possible assignments of remote video signals to local display zones, in accordance with some embodiments.
Figure 2B:
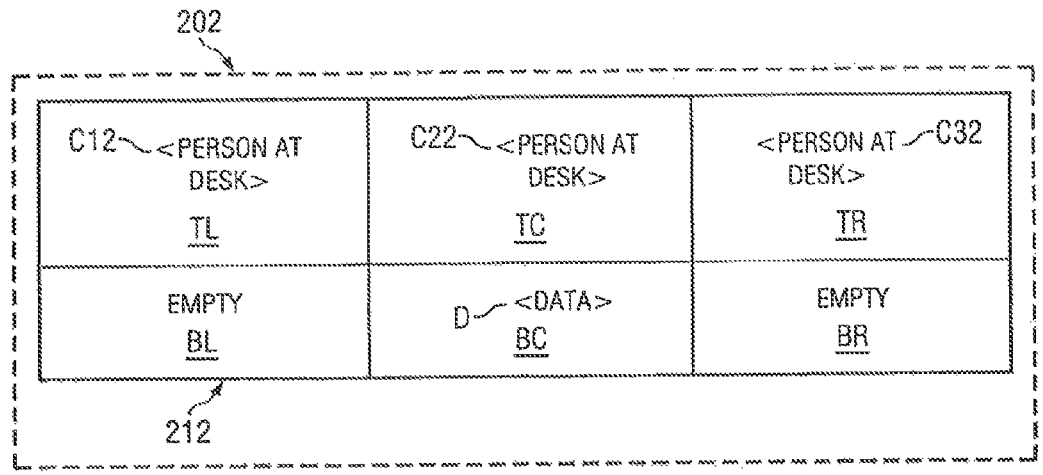
Figure 2C:
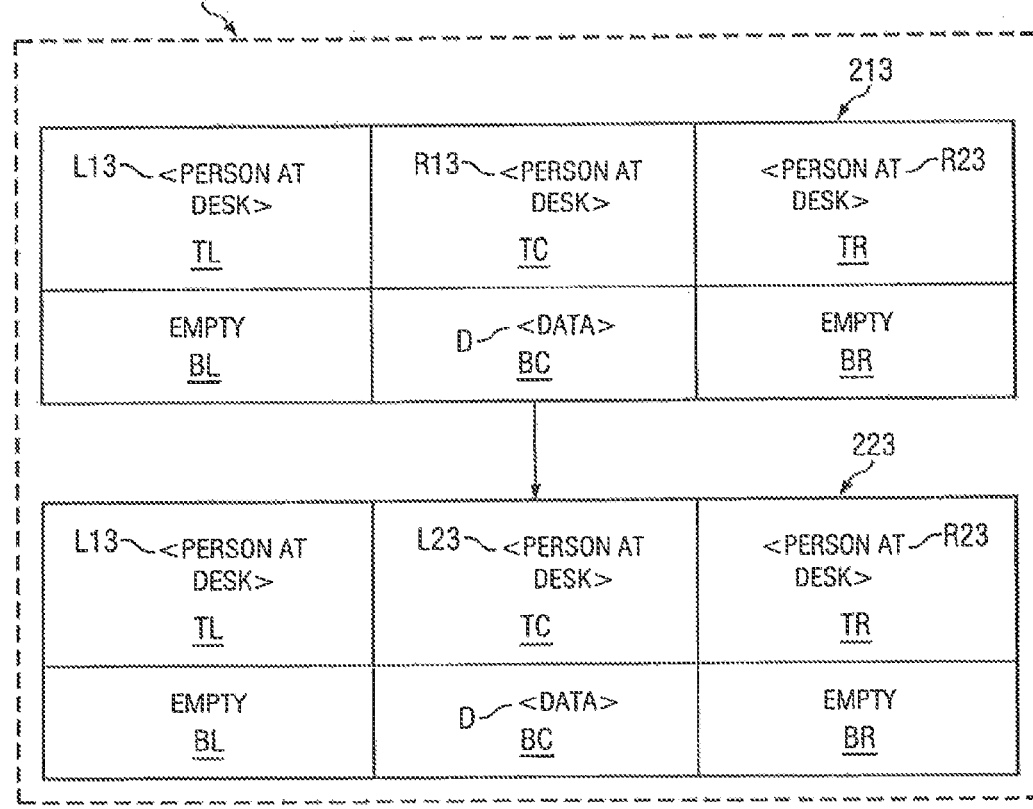
Figure 3:
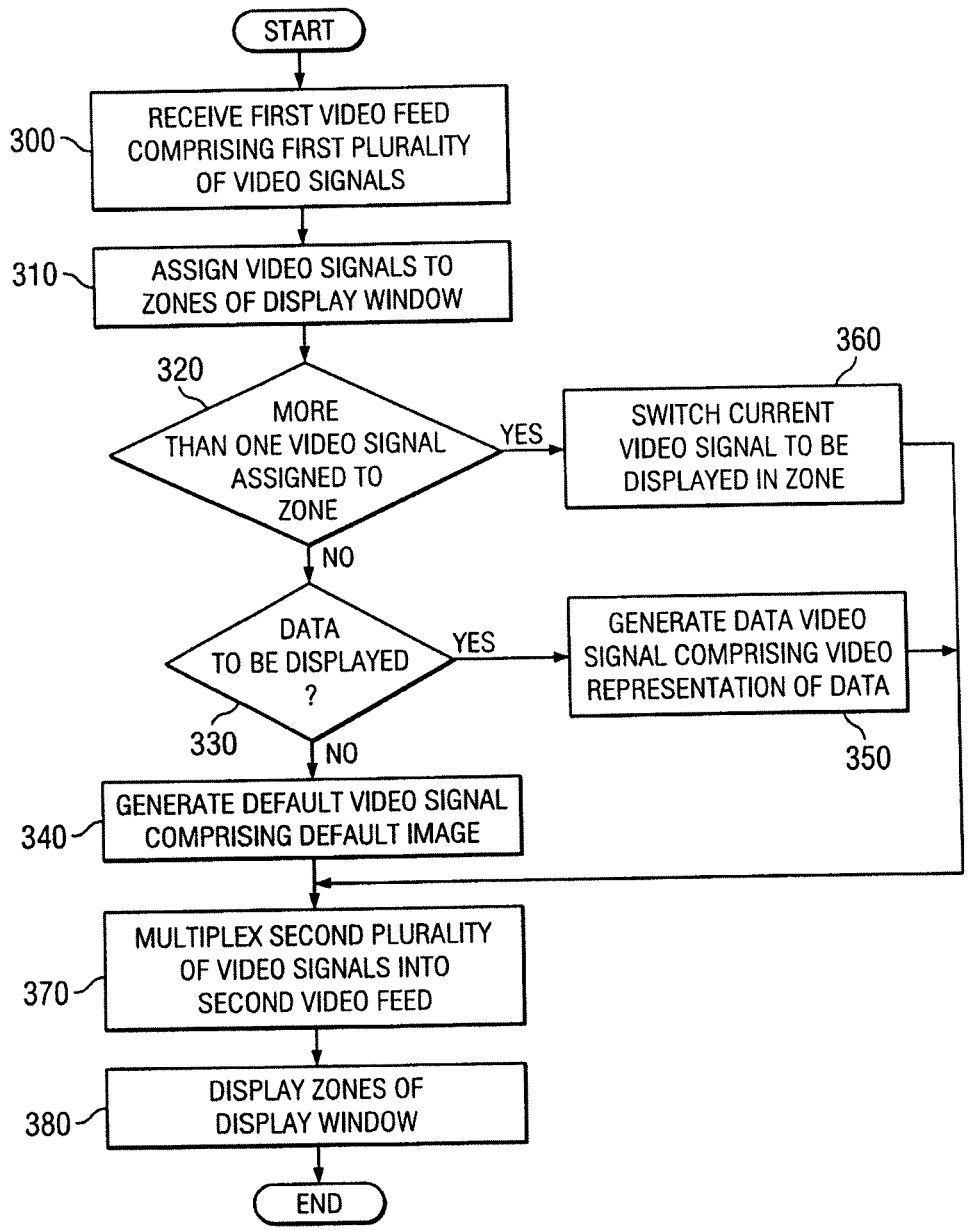
FIG. 3 is a flowchart illustrating a method for displaying a videoconference, in accordance with some embodiments.

Particular embodiments and their advantages are best understood by referring to FIGS. 1 through 3 of the drawings, like numerals being used for like and corresponding parts of the various drawings.

FIG. 1 is a block diagram illustrating a system 10 for conducting a videoconference between locations using at least one telepresence system. The illustrated embodiment includes a network 102 that facilitates a videoconference between remotely located sites 100 using telepresence equipment 106. Sites 100 include any suitable number of users 104 that participate in the videoconference. System 10 provides users 104 with a realistic videoconferencing experience even though the number of monitors 110 at a local site 100 may be less than the number of video signals generated for the videoconference.

Network 102 represents communication equipment, including hardware and any appropriate controlling logic, for interconnecting elements coupled to network 102 and facilitating communication between sites 100. Network 102 may include a local area network (LAN), a metropolitan area network (MAN), a wide area network (WAN), any other public or private network, a local, regional, or global communication network, an enterprise intranet, other suitable wireline or wireless communication link, or any combination of the preceding. Network 102 may include any combination of gateways, routers, hubs, switches, access points, base stations, and any other hardware, software, or a combination of the preceding that may implement any suitable protocol or communication.

User 104 represents one or more individuals or groups of individuals who may be present for the videoconference. Users 104 participate in the videoconference using any suitable device and/or component, such as audio Internet Protocol (IP) phones, video phone appliances, personal computer (PC) based video phones, and streaming clients. During the videoconference, users 104 engage in the session as speakers or participate as non-speakers.

Telepresence equipment 106 facilitates the videoconferencing among users 104. Telepresence equipment 106 may include any suitable elements to establish and facilitate the videoconference. For example, telepresence equipment 106 may include loudspeakers, user interfaces, controllers, microphones, or a speakerphone. In the illustrated embodiment, telepresence equipment 106 includes cameras 108, monitors 110, processor 112, memory module 113, and network interface 114.

Cameras 108 may include any suitable hardware and/or software to facilitate capturing an image of user 104 and her surrounding area as well as providing the image to other users 104. Cameras 108 may capture and transmit the image of user 104 as a video signal (e.g. a high definition video signal). Depending on the embodiment, the video signal transmitted may comprise a separate signal (e.g., each camera 108 transmits its own signal) or a combined signal (e.g., the signal from multiple sources are combined into one video signal). Monitors 110 may include any suitable hardware and/or software to facilitate receiving the video signal and displaying the image of user 104 to other users 104. For example, monitors 110 may include a notebook PC, a wall mounted monitor, a floor mounted monitor, or a free standing monitor. Monitors 110 may display the image of user 104 using any suitable technology that provides a realistic image, such as high definition, high-power compression hardware, and efficient encoding/decoding standards. Telepresence equipment 106 may establish the videoconference session using any suitable technology and/or protocol, such as Session Initiation Protocol (SIP) or H.323. Additionally, telepresence equipment 106 may support and be interoperable with other video systems supporting other standards, such as H.261, H.263, and/or H.264.

Processor 112 controls the operation and administration of telepresence equipment 106 by processing information and signals received from cameras 108 and interfaces 114. Processor 112 may include any suitable hardware, software, or both that operate to control and process signals. For example, processor 112 may be a programmable logic device, a microcontroller, a microprocessor, any suitable processing device, or any combination of the preceding. Memory 113 may store any data or logic used by processor 112 in providing videoconference functionality. In some embodiments memory 113 may store all, or a portion, of a videoconference. Memory 113 may include any form of volatile or non-volatile memory including, without limitation, magnetic media, optical media, random access memory (RAM), read-only memory (ROM), removable media, or any other suitable local or remote memory component. Interface 114 communicates information and signals to and receives information and signals from network 102. Interface 114 represents any port or connection, real or virtual, including any suitable hardware and/or software that allow telepresence equipment 106 to exchange information and signals with network 102, other telepresence equipment 106, and/or other elements of system 10.

When users 104 join a videoconference, a video signal is generated for each camera 108. More specifically, once users 104a-104h have logged in there may be eight different video signals, one each from cameras 108a-108h. These video signals may then be assigned by processor 112 to monitors 110. The assignments may persist for the duration of the videoconference. Thus, a remote user may be displayed on the same local monitor for the duration of the video conference. This may make it easier for local users to identify who and where the remote user is. More specifically, in the embodiment depicted in FIG. 1, cameras 108e and 108a may be assigned to monitor 110a, camera 108d may be assigned to monitor 110b, and cameras 108f and 108h may be assigned to monitor 110c. Because monitors 110a and 110c have multiple cameras assigned to them, the monitors may switch between the respective assigned cameras based on, for example, which user last spoke or which user is currently speaking the loudest. Thus, as various users 104 speak during the videoconference, the video signal displayed on each monitor 110 may change, but each user 104 may be displayed on the same monitor throughout the videoconference (e.g., user 104e may be displayed on monitor 110a but not on monitor 110b).

In embodiments in which the videoconference described above is being displayed on only one monitor (e.g., monitor 110) or is being recorded for later playback on, for example, a computer monitor, it may be desirable to divide the screen of the monitor into separate zones with each zone functioning as though it were a separate monitor. This may allow each zone to have one or more of cameras 108 assigned to it. For example, a left zone may have cameras 106a, 108e and 106g assigned thereto, a center zone may have cameras 108b and 108d assigned thereto, and a right zone may have cameras 108c, 108f and 108h assigned thereto. This may allow for an accurate recreation of the videoconference experience of a multi-monitor videoconference (e.g., eye gaze may be more accurately reproduced). Thus, as various users 104 speak during the videoconference, the video signal displayed within each zone of monitor 110d may change to display the image of the last speaker, but each user 104 may be displayed in the same zone throughout the videoconference (e.g., user 104*a* may be displayed in the left zone but not in the center or right zone). This may also be useful in instances in which a previous videoconference has been recorded and is being played back on a single computer monitor.

Modifications, additions, or omissions may be made to system 10. For example, system 10 may include any suitable number of sites 100 and may facilitate a videoconference between any suitable number of sites 100. As another example, sites 100 may include any suitable number of cameras 108 and monitors 110 to facilitate a videoconference. As yet another example, the videoconference between sites 100 may be point-to-point conferences or multipoint conferences. For point-to-point conferences, the number of monitors 110 or zones at local site 100 may be less than the number of cameras 108 at remote site 100. For multipoint conferences, the aggregate number of cameras 108 at remote sites 100 may be greater than the number of monitors 110 or zones at local site 100. Moreover, the operations of system 10 may be performed by more, fewer, or other components. Additionally, operations of system 10 may be performed using any suitable logic.

FIG. 2 is a chart illustrating possible assignments of remote video signals to local display zones, in accordance with some embodiments. More specifically, depicted in FIG. 2 is the assignment of the video signals from remote cameras from different remote sites in three different scenarios. The remote cameras may be positioned to capture various users who may be sitting at a conference table. The remote cameras may each output a separate video signal comprising their respective captured image. For remote sites that comprise multiple cameras, the left/right relationship of each camera may be known (e.g., if there are three cameras left, center, right, it may be known that the center camera is to the right of the left camera). The depicted scenarios are not intended to be exhaustive of the numerous scenarios that may be implemented in different embodiments and/or circumstances. Scenario 201 involves six cameras from three remote sites, scenario 202 involves three cameras from three remote sites and scenario 203 involves four cameras from two remote sites. In each scenario the videoconference is being viewed within a single window that has been divided into six zones. The six zones are top left TL, top center TC, top right TR, bottom left BL, bottom center BC, and bottom right BR. While the image of a user depicted in any of the zones may be referred to as simply a user (e.g. user L11) it should be noted that in other embodiments user L11 may include more than one user, or no users. More specifically, user L11 may include two users who are both within the field of vision of the camera, or user L11 may simply include that portion of a conference room within the camera's field of vision without any users being present. Furthermore, in all three of the depicted scenarios the three top zones, TL, TC and TR may depict users while the three bottom zones EL, BC and BR, may depict data D or an image.

The zones depicted in FIG. 2 may represent the zones of a monitor or a window displayed via a monitor. The zones may be viewed while a videoconference is being conducted (e.g., a live videoconference) or they be viewed at a later time e.g., a previously recorded videoconference). In some embodiments, the videoconference may be viewed at a remote site with a single videoconference monitor, such as monitor 110*b* at remote site 100*b* of FIG. 1. In particular embodiments the videoconference may be viewed in a window displayed on a monitor of a multifunction device (e.g., a device used not just for video conferencing), such as a PC computer. Regardless of the display device it may be desirable to recreate the experience of a remote site having multiple monitors, such as remote site 100*a*. Accordingly, by dividing the single monitor into six zones, the single monitor can recreate the multi-monitor effect by treating the three top zones (top left TL, top center TC, and top right TR) like individual monitors. In an embodiment in which the videoconference is viewed within a window, the window may be sized to fit all or any smaller portion of the screen that a user desires.

In scenario 201 the first remote site may comprise at least two cameras with the left camera capturing user L11 and the right camera capturing user R11. User L11 may be sitting on the left hand side of the remote conference table and user R11 may be sitting on the right hand side of the remote conference table. Accordingly, their images are assigned to top left TL and top right TR; this maintains the left/right relationship between users L11 and R11. In other embodiments either L11 or R11 may be assigned to top center TC while still maintaining the left/right relationship (see e.g., state 213). The second remote site may comprise at least three cameras with the left camera capturing user L21, the center camera capturing user C21, and the right camera capturing user R21. User L21 may be sitting on the left hand side of the remote conference table, user C21 may be sitting in the center of the remote conference table and user R21 may be sitting on the right hand side of the remote conference table. Their images are assigned to top left TL, top center TC and top right TR, respectively. As before, this maintains the left/right relationship between users L21, C21, and R21. The third remote site may comprise at least one camera and it may be capturing user C31. Because user C31 is the only user there may not be any left/right relationship to preserve. Therefore, his image may be assigned to any of the three top zones. In this scenario it is assigned to top center TC so that it balances out the assignments. To recap, assigned to top left TL are users L11 and L21; assigned to top center TC are users C21 and C31; and assigned to top right TR are users R11 and R21.

In scenario 202 all three remote sites may comprise at least one camera with each camera capturing a single user; a camera from the first remote cite may capture user C12, a camera from the second remote site may capture C22, and a camera from the third remote site may capture C32. Because there may not be any left/right relationships to preserve each user may be assigned to any of the zones. For example, as shown in scenario 202 user C12 is assigned to top left TL, user C22 is assigned to top center TC, and user C32 is assigned to top right TR.

In scenario 203 the first remote site may comprise at least two cameras with the left camera capturing user L13 and the right camera capturing user R13. The second remote site may similarly comprise at least two cameras with the left camera capturing user L23 and right camera capturing user R23. Users L13 and L23 may be sitting on the left hand side of their respective remote conference tables and users R13 and R23 may be sitting on the right hand side of their respective remote conference tables. As before, the image of each user may be assigned so as to maintain the left/right relationship between the users at their respective remote sites. For example, in scenario 203 the image of user L13 is assigned to top left TL so as to be to the left of the image of user R13 which is assigned to top center TC and the image of user L23 is assigned to center zone TC so as to be to the left of the image of R23 which is assigned to top right TR.

Once a user is assigned to a zone based on their positioning within their respective remote site that assignment may be maintained for the duration of the videoconference. This may allow people viewing a conference to become familiar with who is speaking based on which zone they are in. However, there may be instances, such as scenarios 201 and 203, when the number of remote camera signals is greater than the number of available zones. When this occurs, a zone with multiple users assigned to it may switch between the different users based on one or more different factors. Some of the possible factors that may be used may include who spoke last, the relative priority of the users, the location of the respective remote site, and/or the relative timing of when the users logged into the conference. These factors may also be used in initially assigning users to a zone.

Scenarios 201-203 will be discussed so as to highlight a few features of some embodiments. More specifically, scenario 201 may illustrate how the image that is displayed within a particular zone may switch, scenario 202 may show how a user's relative priority may be used in assigning users to zones, and scenario 203 may demonstrate a way of balancing the number of video signals that are assigned to a particular zone.

For scenario 201, assume that users L11 and R11 log into the conference first and are assigned to top left TL and top right TR, respectively. This can be seen in state 211. Then users L21, C21, and R21 log into the conference. They are assigned to top left TL, top center TC, and top right TR, respectively. In this scenario, top left TL and top right TR each have two users assigned thereto. Because no one has talked yet, the last users to log in, users L21, and R21 are currently displayed, replacing users L11 and R11. This can be seen in state 221. Finally, user C31 logs into the conference and is assigned to top center TC where he is presently displayed because he was the latest user assigned to top center TC to log into the conference. This can be seen in state 231. Then once all the users have logged into the conference, user L11 starts to speak and is displayed within top left TL. This can be seen in state 241. It should be noted that in some embodiments each zone may switch between users independently of the other zones. More specifically, when L11 started to speak, only top left TL switched which user was displayed. While top left TL switched, top right TR continued to display user R21 and not user R11 who is at the same remote site as user L11.

In scenario 202 it may be assumed that user C22 is the CEO of a particular company and that users C21 and C23 are department heads for that same particular company. Because user C22, as the CEO, may be of higher priority than users C21 and C23 he may be assigned to top center TC, while user C21 may be assigned to top left TL and user C23 may be assigned to top right TR. This assignment may be done irrespective of the timing with which the users logged into the videoconference. Furthermore, if a fourth user were to join the conference and be assigned to top center, in some embodiments that fourth user may only be displayed while he is talking (and in some embodiments, for a short time thereafter). This may allow for the highest priority user (e.g., user C22) to be assigned to the center zone of the videoconference and to be displayed as often as possible.

In scenario 203, it may be assumed that users L23 and R23 logged into the conference first followed by users L13 and R13. Because there are four users and only three zones, one or more of the zones may have to have multiple users assigned thereto. In some embodiments the users may simply be assigned solely based on their positioning within their respective remote sites. For example, both users L13 and L23 may be assigned to top left TL and both users R13 and R23 may be assigned to top right TR. This means top left TL and top right TR each have two users assigned thereto while top center TC does not have anyone assigned thereto. This may allow for easy assignments but may be an efficient use of videoconference resources. In particular embodiments, the number of video signals may be taken into account when assigning video signals to a zone. For example, rather than simply assigning users based solely on their positioning within their respective remote sites (e.g., L23 to top left TL), the number of users assigned to each zone may be balanced out in an attempt to evenly distribute the video signals. More specifically, as can be seen in states 213 and 214, users L13, R13, L23 and R23 have been assigned such that each of the three top zones have at least one user assigned thereto and the left/right relationship of the users is maintained. Then as users R13 and L23 speak, the image displayed in top center TC may switch. More specifically, user R13 may initially be displayed in top center TC because he logged into the videoconference after user L23 (state 213), then when user L23 speaks she may be displayed in top center TC (state 223).

In some embodiments, the video feed that supplies the six zones depicted in FIG. 2 may comprise as many discrete video streams as there are video signals, and there may be as many video signals as there are remote cameras or display zones. For example, the video feed used in scenario 201 may comprise six video streams, one for each video signal from each camera. The three video signals displayed in the three top zones may be determined locally and the appropriate video signal selected from the six video streams of the video feed. In some embodiments the three video signals to be displayed in the three top zones may be determined at a remote location and the video feed may comprise only three video streams, with each video stream comprising one of the three video signals selected to be displayed in one of the three top zones. Because the video signal that is displayed in any given zone may switch during the videoconference, the corresponding video stream may also switch during videoconference. In particular embodiments, the device displaying the videoconference may generate a graphic to be displayed in the three bottom zones or any other zones that do not have a video signal assigned thereto. In some embodiments, the video feed may comprise an additional video stream for data that is to be displayed in one of the three bottom zones.

In particular embodiments the video feed may comprise a video feed formed by combining several video signals (e.g., via multiplexing the signals into a single video feed). In such an embodiment the plurality of discrete video signals may be received at a single site that may make the initial assignment of a video signal to a zone and/or determine which of the video signals will be displayed. The determination of which video signal will be displayed may change during the course of the videoconference. The three video signals determined to be displayed in the three top zones may then be combined along with three additional video signals to be used for the three bottom zones into a single stream for the vide feed. Depending on the circumstances the three video signals for use in the bottom three zones may comprise video of data or a static image. Regardless of the composition of the video feed, once it is formed it may then be recorded, transmitted or displayed either locally or at a remote location.

The video signals may be combined and/or switched in any of a variety of locations. For example, in some embodiments the site hosting the conference may be responsible for combining/switching the multiple video signals. In some embodiments a remote device not actively participating in the videoconference (e.g., a server for recording videoconferences) may perform any needed combining/switching. In particular embodiments the device on which the videoconference is being viewed may combine/switch the video signals as needed. It should be noted that these examples are not intended to be exhaustive nor are they mutually exclusive.

Furthermore, the device performing any necessary combining/switching may also record the videoconference.

The type of switching and combining that is performed in some embodiments may depend on how the videoconference is going to be viewed. For example, if the videoconference is going to be viewed on a PC computer using a standard video player then the video signals from all the remote sites may need to be combined into a single stream in a format that the standard video player can understand. For example, in some embodiments the multiple video signals may be combined into a video feed comprising a single video stream that is compressed using, for example, MPEG compression, which may then be streamed to the computer playing the videoconference. Furthermore, because the video is being viewed using a standard video player all the switching and assigning may be done before the video is combined. Thus, the video feed that is ultimately sent comprises the video signal for the top three zones as well as the bottom three zones.

In another example, if the video conference is going to be viewed using telepresence hardware that is able to switch between a plurality of video signals the video feed may comprise a plurality of discrete video streams, each video stream comprising a video signal. The telepresence hardware may then perform any switching that may need to be done as well as supply any imagery that may be needed for the bottom three zones.

In some embodiments the videoconference may include data that may be displayed in one of the bottom three zones. In particular embodiments the data is presented via a separate video signal representation of the data, not as the data itself. For example, where the data comprises a slide show presentation, bottom center BC may display, for example, a video signal of the slides and not the data representing the slides or a webpage comprising the slides. In embodiments in which the plurality of video signals are combined, the video signal for the data may similarly be combined with the other video signals. While FIG. 2 only illustrates data D as being displayed in bottom center BC, in other embodiments it may displayed in bottom left BL and/or bottom right BR.

In particular embodiments, a standard image may be presented in any of the zones or display portions in which there is not a video signal assigned. The standard image may comprise a solid color or a specific image such as a company logo.

Modifications, additions, or omissions may be made while displaying video signals within a single display. For example, there may be a different number of zones (e.g., 2, 4 or more zones) within which video signals may be assigned. As another example, some embodiments may use the top zones to display the data video signals and the bottom zones to display the video signals of the users. Furthermore, in some embodiments one or more of the bottom zones may display a remote user.

FIG. 3 is a flowchart illustrating a method for displaying a videoconference, in accordance with some embodiments. The illustrated method allows, among other things, for telepresence equipment (e.g. interface 114, memory 113 and processor 112 of FIG. 1) to combine various video signals received from various videoconference participants into a single stream that may be displayed on any device capable of displaying a video stream (e.g., a PC running an MPEG compatible video player).

The method begins at step 300 where a first video feed comprising a first plurality of video signals is received by the telepresence equipment. Depending on the embodiments, the first plurality of video signals may comprise video signals from cameras capturing the participants of the video conference, video representations of data, and/or static images.

Each of the multiple video signals may then be assigned to a zone of a display window at step 310. Each video signal may be assigned to only one zone for the videoconference. This may allow users viewing the videoconference to become familiar with where particular users are displayed. Furthermore, in assigning a video signal from a remote camera to a particular zone the telepresence equipment may take into account the number of available zones, the positioning of the zones, the number and type of video signals, the relative position of the cameras supplying the video signal if a particular site has more than one camera, the relative priority of users participating in the video conference, and/or any other factors that may be desirable in determining which zone should display which video signals. For example, the telepresence equipment may assign a higher priority user to a center zone, or if a particular remote site has two cameras the telepresence equipment may preserve the left/right relationship of the two cameras.

For purposes of this method it may be assumed that the telepresence equipment has created a display window with six zones, three zones along a top row and three zones along a bottom row, similar to the six zones used in FIG. 2. It may further be assumed that, like in FIG. 2, the top three zones will be used for displaying the participants of the videoconference and the bottom three zones may be used for data or static imagery. Other embodiments may include a display window with any other number of zones and with any suitable configuration to which data and/or video may be assigned. Additionally, for simplicity, it may be assumed that in this embodiment the first video feed received at step 300 comprises only video signals generated by cameras capturing the video conference participants and that at step 310 these video signals are assigned to the three top zones (the three bottom zones will have video signals assigned thereto later in the method).

At step 360, if there is more than one video signal assigned to one of the three top zones the telepresence equipment switches the current video signal to be displayed in the zone. The switching at step 360 may be performed throughout the videoconference. For example, in some embodiments the telepresence equipment may be configured to display that last user to speak, in such an embodiment the current video signal displayed in a zone may be switched each time one of the users assigned to the zone, but not currently displayed, speaks. If there is only one video signal assigned to a zone then there may not be a need to do any switching for that zone because the zone may simply display that one signal during the video conference.

For the three bottom zones, the telepresence equipment may need to generate the necessary video signals. More specifically, if there is data that is to be displayed with the videoconference, then at step 350 the telepresence equipment may generate a data video signal comprising a video representation of the data. The data video signal may then be assigned to one of the zones, for example the middle zone of the three bottom zones.

Then, at step 340, for each zone that does not have a video signal assigned thereto, whether in the top row or the bottom row, a default video signal comprising a default image is generated and assigned to the zone. The default image may comprise a solid color, a company logo, or any other graphic or image that may be desired.

Once any necessary data video signals and default video signals have been generated (steps 350 and 340), and the appropriate video signal has been switched (step 360) the telepresence equipment may have a second plurality of video signals that are currently to be displayed. The second plurality of video signals may be different than the first plurality of video signals. For example, the first plurality of video signals may comprise five video signals from five different cameras, the second plurality of video signals may comprise the three video signals (switched from the five video signals of the first plurality of video signals) to be displayed in the top row, a data video signal to be displayed in the center of the bottom row, and two default video signals to be displayed on the left and right of the bottom row.

At step 370 this second plurality of video signals is multiplexed into a second video feed. The second video feed comprises the six video signals for the six zones of the display window. Furthermore, the second video feed may comprise a single stream corresponding to the six multiplexed video signals. Then at step 380 the display window is displayed, for example on a PC monitor.

Modifications, additions, or omissions may be made to the method depicted in FIG. 3. The flowchart may include more, fewer, or other steps. For example, before switching between video signals at step 360, a transition effect may be used to transition between video signals. Additionally, steps may be performed in any suitable order and by any suitable component.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for displaying a videoconference, comprising:
   receiving a first video feed, the first video feed comprising a first plurality of video signals, each video signal from at least one source and originating from one or more sites;
   assigning for a videoconference each video signal of the first plurality of video signals to a zone of a plurality of zones of a display window based on positions of the zones, each zone of the plurality of zones able to display at least one video signal at a time;
   for each zone of the plurality of zones of the display window to which more than one video signal has been assigned, switching the current video signal to be displayed in the zone to another video signal assigned to the zone based on a switching protocol; and
   wherein assigning for a videoconference each video signal of the first plurality of video signals to a zone of a plurality of zones of a display window based on positions of the zones comprises assigning at least some video signals of the first plurality of video signals to zones of the plurality of zones based on relative positions of users in the at least some video signals at a particular remote site to maintain the relative positions on the display window.

2. The method of claim 1, further comprising displaying:
   for each zone of the plurality of zones of the display window to which one video signal has been assigned, the one video signal assigned to the respective zone; and
   for each zone of the plurality of zones of the display window to which more than one video signal has been assigned, the currently switched video signal to be displayed in the respective zone.

3. The method of claim 1, further comprising generating a second video feed comprising a second plurality of video signals, each of the second plurality of video signals corresponding to a video signal currently switched to be displayed in a zone of the plurality of zones.

4. The method of claim 3, further comprising generating a default video signal comprising a default image to be displayed within each zone of the plurality of zones to which a video signal of the first video feed was not assigned.

5. The method of claim 3, further comprising generating a data video signal comprising a video representation of data to be displayed within at least one zone of the plurality of zones to which a video signal of the first video feed was not assigned.

6. The method of claim 3, wherein generating a second video feed comprising a second plurality of video signals comprises multiplexing the second plurality of video signals into the second video feed.

7. The method of claim 3, wherein generating a second video feed comprising a second plurality of video signals comprises transmitting the second plurality of video signals as separate video streams within the second video feed.

8. The method of claim 1, wherein switching the current video signal to be displayed in the zone to another video signal assigned to the zone based on a switching protocol comprises switching the current video signal to be displayed in the zone to another video signal assigned to the zone based on which video signal of the plurality of video signals assigned to the zone has the highest audio level.

9. The method of claim 1, wherein:
   at least two video signals of the plurality of video signals are received from at least two separate cameras located at a first remote site of the one or more sites; and
   assigning for the videoconference each video signal of the first plurality of video signals to a zone of the plurality of zones of the display window comprises assigning for the videoconference each video signal of the first plurality of video signals to a zone based on a relative location of the at least two separate cameras located at the first remote site.

10. The method of claim 1, wherein assigning for a videoconference each video signal of the first plurality of video signals to a zone of a plurality of zones of a display window comprises balancing the video signals between the plurality of zones of the display window such that no zone of the plurality of zones is assigned more than two video signals more than any other zone of the plurality of zones.

11. The method of claim 1, further comprising recording:
   for each zone of the plurality of zones of the display window to which one video signal has been assigned, the one video signal assigned to the respective zone; and
   for each zone of the plurality of zones of the display window to which more than one video signal has been assigned, the currently switched video signal to be displayed in the respective zone.

12. The method of claim 1, wherein assigning for a videoconference each video signal of the first plurality of video signals to a zone of a plurality of zones of a display window comprises assigning for a duration of the videoconference each video signal of the first plurality of video signals to a zone of a plurality of zones of a display window based on a total number of video signals assigned to each zone, at least two zones comprising at least two video signals assigned thereto.

13. A system for displaying a videoconference, comprising:
   an interface operable to receive a first video feed, the first video feed comprising a first plurality of video signals, each video signal from at least one source and originating from one or more sites; and a processor coupled to the interface and operable to:
assign for a videoconference each video signal of the first plurality of video signals to a zone of a plurality of zones of a display window based on positions of the zones, each zone of the plurality of zones able to display at least one video signal at a time; and
for each zone of the plurality of zones of the display window to which more than one video signal has been assigned, switch the current video signal to be displayed in the zone to another video signal assigned to the zone based on a switching protocol; and
wherein a processor operable to assign for a videoconference each video signal of the first plurality of video signals to a zone of a plurality of zones of a display window based on positions of the zones comprises a processor operable to assign at least some video signals of the first plurality of video signals to zones of the plurality of zones based on relative positions of users in the at least some video signals at a particular remote site to maintain the relative positions on the display window.

14. The system of claim 13, further comprising a monitor coupled to the processor and operable to display:
for each zone of the plurality of zones of the display window to which one video signal has been assigned, the one video signal assigned to the respective zone; and
for each zone of the plurality of zones of the display window to which more than one video signal has been assigned, the currently switched video signal to be displayed in the respective zone.

15. The system of claim 13, wherein the processor is further operable to generate a second video feed comprising a second plurality of video signals, each of the second plurality of video signals corresponding to a video signal currently switched to be displayed in a zone of the plurality of zones.

16. The system of claim 15, wherein the processor is further operable to generate a default video signal comprising a default image to be displayed within each zone of the plurality of zones to which a video signal of the first video feed was not assigned.

17. The system of claim 15, wherein the processor is further operable to generate a data video signal comprising a video representation of data to be displayed within at least one zone of the plurality of zones to which a video signal of the first video feed was not assigned.

18. The system of claim 15, wherein the processor operable to generate a second video feed comprising a second plurality of video signals comprises a processor operable to multiplex the second plurality of video signals into the second video feed.

19. The system of claim 15, wherein the processor operable to generate a second video feed comprising a second plurality of video signals comprises a processor operable to transmit the second plurality of video signals as separate video streams within the second video feed.

20. The system of claim 13, wherein the processor operable to switch the current video signal to be displayed in the zone to another video signal assigned to the zone based on a switching protocol comprises a processor operable to switch the current video signal to be displayed in the zone to another video signal assigned to the zone based on which video signal of the plurality of video signals assigned to the zone has the highest audio level.

21. The system of claim 13, wherein:
at least two video signals of the plurality of video signals are received from at least two separate cameras located at a first remote site of the one or more sites; and
the processor operable to assign for the videoconference each video signal of the first plurality of video signals to a zone of the plurality of zones of the display window comprises a processor operable to assign for the videoconference each video signal of the first plurality of video signals to a zone based on a relative location of the at least two separate cameras located at the first remote site.

22. The system of claim 13, wherein the processor operable to assign for a videoconference each video signal of the first plurality of video signals to a zone of a plurality of zones of a display window comprises a processor operable to balance the video signals between the plurality of zones of the display window such that no zone of the plurality of zones is assigned more than two video signals more than any other zone of the plurality of zones.

23. The system of claim 13, wherein the processor is further operable to record:
for each zone of the plurality of zones of the display window to which one video signal has been assigned, the one video signal assigned to the respective zone; and
for each zone of the plurality of zones of the display window to which more than one video signal has been assigned, the currently switched video signal to be displayed in the respective zone.

24. The system of claim 13, wherein the processor operable to assign for a videoconference each video signal of the first plurality of video signals to a zone of a plurality of zones of a display window comprises the processor operable to assign for a duration of the videoconference each video signal of the first plurality of video signals to a zone of a plurality of zones of a display window based on a total number of video signals assigned to each zone, at least two zones comprising at least two video signals assigned thereto.

25. Logic embodied in a non-transitory computer readable medium, the computer readable medium comprising code operable to:
receive a first video feed, the first video feed comprising a first plurality of video signals, each video signal from at least one source and originating from one or more sites;
assign for a videoconference each video signal of the first plurality of video signals to a zone of a plurality of zones of a display window based on positions of the zones, each zone of the plurality of zones able to display at least one video signal at a time;
for each zone of the plurality of zones of the display window to which more than one video signal has been assigned, switch the current video signal to be displayed in the zone to another video signal assigned to the zone based on a switching protocol; and
wherein code operable to assign for a videoconference each video signal of the first plurality of video signals to a zone of a plurality window based on positions of the zones comprises code operable to assign at least some video signals of the first plurality of video signals to zones of the plurality of zones based on relative positions of users in the at least some video signals at a particular remote site to maintain the relative positions on the display window.

26. The medium of claim 25, wherein the code is further operable to display:
for each zone of the plurality of zones of the display window to which one video signal has been assigned, the one video signal assigned to the respective zone; and
for each zone of the plurality of zones of the display window to which more than one video signal has been assigned, the currently switched video signal to be displayed in the respective zone.

27. The medium of claim 25, wherein the code is further operable to generate a second video feed comprising a second plurality of video signals, each of the second plurality of video signals corresponding to a video signal currently switched to be displayed in a zone of the plurality of zones.

28. The medium of claim 27, wherein the code is further operable to generate a default video signal comprising a default image to be displayed within each zone of the plurality of zones to which a video signal of the first video feed was not assigned.

29. The medium of claim 27, wherein the code is further operable to generate a data video signal comprising a video representation of data to be displayed within at least one zone of the plurality of zones to which a video signal of the first video feed was not assigned.

30. The medium of claim 27, wherein the code operable to generate a second video feed comprising a second plurality of video signals comprises code operable to multiplex the second plurality of video signals into the second video feed.

31. The medium of claim 27, wherein the code operable to generate a second video feed comprising a second plurality of video signals comprises code operable to transmit the second plurality of video signals as separate video streams within the second video feed.

32. The medium of claim 25, wherein the code operable to switch the current video signal to be displayed in the zone to another video signal assigned to the zone based on a switching protocol comprises code operable to switch the current video signal to be displayed in the zone to another video signal assigned to the zone based on which video signal of the plurality of video signals assigned to the zone has the highest audio level.

33. The medium of claim 25, wherein:
at least two video signals of the plurality of video signals are received from at least two separate cameras located at a first remote site of the one or more sites; and
the code operable to assign for the videoconference each video signal of the first plurality of video signals to a zone of the plurality of zones of the display window comprises code operable to assign for the videoconference each video signal of the first plurality of video signals to a zone based on a relative location of the at least two separate cameras located at the first remote site.

34. The medium of claim 25, wherein the code operable to assign for a videoconference each video signal of the first plurality of video signals to a zone of a plurality of zones of a display window comprises code operable to balance the video signals between the plurality of zones of the display window such that no zone of the plurality of zones is assigned more than two video signals more than any other zone of the plurality of zones.

35. The medium of claim 25, wherein the code is further operable to record:
for each zone of the plurality of zones of the display window to which one video signal has been assigned, the one video signal assigned to the respective zone; and
for each zone of the plurality of zones of the display window to which more than one video signal has been assigned, the currently switched video signal to be displayed in the respective zone.

36. The medium of claim 25, wherein the code operable to assign for a videoconference each video signal of the first plurality of video signals to a zone of a plurality of zones of a display window comprises the code operable to assign for a duration of the videoconference each video signal of the first plurality of video signals to a zone of a plurality of zones of a display window based on a total number of video signals assigned to each zone, at least two zones comprising at least two video signals assigned thereto.

37. The method of claim 1, wherein assigning for a videoconference each video signal of the first plurality of video signals to a zone of a plurality of zones of a display window comprises assigning for a videoconference each video signal of the first plurality of video signals to a zone of a plurality of zones of a display window based on relative priority of users in at least some video signals of the first plurality of video signals.

38. The method of claim 1, wherein the switching protocol utilizes a relative priority of users in video signals assigned to a particular zone.

* * * * *